(12) United States Patent
Dirnberger et al.

(10) Patent No.: US 10,688,427 B2
(45) Date of Patent: Jun. 23, 2020

(54) FILTER ELEMENT OF A FILTER DEVICE, FILTER HOUSING AND FILTER DEVICE

(71) Applicant: MANN+HUMMEL GmbH, Ludwigsburg (DE)

(72) Inventors: Timo Dirnberger, Marbach (DE); Daniel Schmid, Sachsenheim (DE); Bernd Joos, Lorch (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/207,161

(22) Filed: Dec. 2, 2018

(65) Prior Publication Data

US 2019/0168148 A1 Jun. 6, 2019

Related U.S. Application Data

(63) Continuation of application No. PCT/EP2017/060872, filed on May 8, 2017.

(30) Foreign Application Priority Data

Jun. 2, 2016 (DE) .......................... 10 2016 006 607

(51) Int. Cl.
*B01D 46/10* (2006.01)
*B01D 39/00* (2006.01)
(Continued)

(52) U.S. Cl.
CPC ......... *B01D 46/0002* (2013.01); *B01D 46/10* (2013.01); *B01D 46/521* (2013.01);
(Continued)

(58) Field of Classification Search
CPC .. B01D 46/0002; B01D 46/521; B01D 46/10; B01D 23/00; B01D 39/00; B01D 35/00; B01D 2271/02; E05B 65/00; E05B 63/00
(Continued)

(56) References Cited

U.S. PATENT DOCUMENTS 6,293,984 B1 9/2001 Oda et al.
8,409,312 B2 * 4/2013 Gorg .................. B01D 46/0063
55/385.3
(Continued)

FOREIGN PATENT DOCUMENTS

AU 2003244521 A1 3/2004
DE 4326731 A1 2/1995
(Continued)

*Primary Examiner* — Minh Chau T Pham
(74) *Attorney, Agent, or Firm* — James Hasselbeck (57) ABSTRACT

A filter element has a filter bellows with circumferential seal having a seal region and a fastening region with radial and axial fastening sections. The radial fastening section has a holding surface facing away from the filter bellows and engaging a radially inner pressure-exerting section of a housing. The axial fastening section provides a radially inner boundary of a circumferential groove of the seal region that receives a radially outer pressure-exerting section of the housing. A seal projection forms a radially outer boundary of the groove. The seal region has an axially acting sealing surface opposite the groove axially spaced farther from an axial filter bellows end face than the holding surface. Axial spacing between groove base and axially acting sealing surface is greater than a spacing between a transition of the groove base into the axial fastening section and a transition of the holding surface into the seal region.

18 Claims, 5 Drawing Sheets

(51) Int. Cl.
  *B01D 35/00* (2006.01)
  *E05B 65/00* (2006.01)
  *E05B 63/00* (2006.01)
  *B01D 46/00* (2006.01)
  *B01D 46/52* (2006.01)
  *B01D 24/00* (2006.01)

(52) U.S. Cl.
  CPC .............. *E05B 63/00* (2013.01); *E05B 65/00* (2013.01); *B01D 23/00* (2013.01); *B01D 35/00* (2013.01); *B01D 39/00* (2013.01); *B01D 2271/02* (2013.01)

(58) Field of Classification Search
  USPC ...... 55/385.3, 495, 497, 498, 502, 503, 490, 55/493, DIG. 5; 123/198 E; 210/435; 454/158; 264/46.4, 259
  See application file for complete search history.

(56) References Cited

U.S. PATENT DOCUMENTS

| | | | |
|---|---|---|---|
| 9,630,131 B2 | 4/2017 | Sudermann et al. | |
| 2006/0080949 A1* | 4/2006 | Moriyama | B01D 46/0049 55/490 |
| 2013/0291503 A1 | 11/2013 | Von Merkatz | |
| 2014/0165518 A1 | 6/2014 | Ohashi et al. | |
| 2014/0260143 A1* | 9/2014 | Kaiser | B01D 46/10 55/501 |
| 2014/0318090 A1 | 10/2014 | Rieger et al. | |
| 2014/0318091 A1* | 10/2014 | Rieger | B01D 46/10 55/502 |
| 2015/0013289 A1* | 1/2015 | Hasenfratz | F02M 35/02416 55/497 |
| 2015/0020489 A1* | 1/2015 | Sudermann | B01D 46/0001 55/502 |

FOREIGN PATENT DOCUMENTS

| | | |
|---|---|---|
| DE | 102008027847 A1 | 12/2009 |
| DE | 102011078057 A1 | 1/2013 |
| DE | 102012005530 A1 | 9/2013 |
| JP | H0166458 U | 4/1989 |
| WO | 2009150165 A1 | 12/2009 |
| WO | 2013139901 A2 | 9/2013 |
| WO | 2016046254 A1 | 3/2016 |

* cited by examiner

FILTER ELEMENT OF A FILTER DEVICE, FILTER HOUSING AND FILTER DEVICE

CROSS-REFERENCE TO RELATED APPLICATIONS

This application is a continuation application of international application No. PCT/EP2017/060872 having an international filing date of May 8, 2017 and designating the United States, the international application claiming a priority date of 2 Jun. 2016 based on prior filed German patent application No. 10 2016 006 607.5, the entire contents of the aforesaid international application and the aforesaid German patent application being incorporated herein by reference.

BACKGROUND OF THE INVENTION

The invention concerns a filter element for a filter device for fluid, in particular air, gas, fuel, oil, water, aqueous urea solution or the like, in particular of an internal combustion engine, in particular of a motor vehicle, which can be exchangeably arranged in a filter housing between at least one inlet and at least one outlet for fluid, wherein the filter element comprises at least one filter bellows with at least one filter medium and at least one seal, which is arranged relative to an axis of the filter element circumferentially at an end face edge of the filter bellows, wherein the at least one seal comprises a circumferential fastening region with a radial fastening section that extends in radial direction from the exterior to the interior and an axial fastening section that extends with at least one directional component parallel to the axis and a circumferential seal region, wherein the fastening region with the radial fastening section and the axial fastening section engages about the edge of the filter bellows, wherein a rear side of the radial fastening section facing away from the filter bellows forms a holding surface for a housing-associated pressure-exerting section that is radially inward relative to the axis, wherein a rear side of the axial fastening section facing away from the filter bellows forms a radially inner boundary of an at least partially circumferential groove in the seal region for receiving a radially outer housing-associated pressure-exerting section, wherein the groove at the radially outer circumferential side oppositely positioned relative to the axial fastening section, viewed in radial direction from the interior to the exterior, is delimited by a circumferential seal projection, which, viewed in axial direction, projects past the axial fastening section, wherein at the exterior side of the seal region positioned axially opposite the groove, a circumferential sealing surface acting relative to the axis at least in axial direction is arranged, which is located at a greater axial spacing relative to the end face of the filter bellows than the holding surface of the radial fastening section.

Moreover, the invention concerns a filter housing of a filter device for fluid, in particular air, gas, fuel, oil, water, aqueous urea solution or the like, in particular of an internal combustion engine, in particular of a motor vehicle, with at least one inlet for fluid to be filtered and at least one outlet for filtered fluid, wherein in the filter housing at least one filter element is or can be exchangeably arranged such that it separates the at least one inlet from the at least one outlet, wherein the filter housing comprises at least one first housing part and one second housing part which, for opening the filter housing, are at least partially separable from each other, and the at least one first housing part and the at least one second housing part delimit a seal chamber, which extends circumferentially relative to an axis of the filter housing, for receiving at least one seal of at least one filter element, wherein the at least one second housing part comprises at least one at least partially circumferential sealing surface that is oriented in sections parallel to the axis for seal-tight contact of the at least one seal and the at least one first housing part comprises an at least partially circumferential, radially outer pressure-exerting section, which is positioned axially opposite the at least one sealing surface relative to the axis, with at least one partially circumferential, radially outer pressure-exerting surface for pressing the at least one seal against the at least one sealing surface, the at least one second housing part comprises at least one, relative to the axis, partially circumferential, radially inner pressure-exerting section with an at least partially circumferential, radially inner pressure-exerting surface radially inside the at least one sealing surface for pressing the at least one filter element in axial direction, and wherein the at least one second housing part comprises, radially outside of the at least one sealing surface and of the radially outer pressure-exerting section relative to the axis, a circumferential wall that delimits at least partially the seal chamber in radially outward direction.

Also, the invention concerns a filter device with a filter housing in which at least one filter element is arranged.

WO 2013/139901 A2 discloses a filter insert part for a filter device which is preferably used for gas filtration, for example, for filtration of intake air for an internal combustion engine. The filter insert part comprises a filter element as well as a preferably circumferentially extending seal part which is arranged at the filter element. The filter insert part is inserted into a filter housing of the filter device wherein the seal part separates the raw side from the clean side of the filter element and seal-tightly rests against a wall of the filter housing in the mounted state. It is, for example, possible that a seal section of the seal part is received in a receiving channel of the housing and is loaded with a force by a further housing part, for example, a cover. The loading direction in this context is either parallel to the flow-through direction of the filter element, i.e., axial, or transverse to the flow direction, i.e., radial.

The invention has the object to design a filter element, a filter housing, and a filter device of the aforementioned kind, in which the at least one seal can be arranged safely, in a space-saving and stable way in particular in a seal chamber of the filter housing.

SUMMARY OF THE INVENTION

This object is solved according to the invention in that an axial spacing between a base of the groove and the sealing surface is greater than a spacing between a transition of the base of the groove into the axial fastening section and a transition of the holding surface into the seal region.

According to the invention, the at least one seal comprises between the sealing surface and the holding surface a tapered section which can be arranged in a corresponding housing-associated gap. At both sides of the tapered section, the at least one seal can project past the corresponding housing-associated gap in the installed state. In this way, it can be prevented that, in the installed state, the seal can be pulled out of the corresponding housing-associated seal chamber.

Advantageously, a ratio between the axial spacing between the base of the groove and the sealing surface, on the one hand, and the spacing between the transition of the base of the groove into the axial fastening section and the transition of the holding surface into the seal region, on the other hand, can amount to between approximately 1 to 0.5 and 1 to 0.9, in particular approximately 1 to 0.66.

Advantageously, an axial spacing between a base of the groove and the sealing surface can be greater than an axial spacing between the base of the groove and the free rim of the seal projection. The axial extension of the seal projection can be smaller than the axial extension of the seal region between the groove and the sealing surface. In this way, the at least one seal as a whole can be designed to be more stable and more compact. A space requirement of the at least one seal, in particular in axial direction, can thus be reduced.

In the groove, a housing-associated pressure-exerting section can be received. In this way, the at least one seal can be held on the housing-associated pressure-exerting section. The at least one seal can be safely received on the at least one radially outer pressure-exerting section. Sliding off of the at least one seal can be avoided by means of the groove.

With the at least one radially inner pressure-exerting section it can be prevented that the at least one seal can be pulled out of a seal chamber delimited by the pressure-exerting section. In this way, the at least one seal can be held in particular in the at least one seal chamber even when loading the filter element, in particular an air filter element, with liquid, in particular water, or in case of pressure pulsations. By a targeted selection of the proportions of the at least one seal, on the one hand, and the housing-associated components, in particular the housing-associated pressure-exerting sections, a circumferential wall, and a seal chamber, on the other hand, positioning, centering, and holding of the seal and/or of the filter element, in particular in operation of the filter device, can be improved.

The at least one radially inner pressure-exerting section and the at least one radially outer pressure-exerting section can engage the at least one seal from oppositely positioned sides. In this way, the at least one seal can be held between the at least one radially inner pressure-exerting section and the at least one radially outer pressure-exerting section. Advantageously, the at least one seal can widen in cross section behind the at least one radially inner pressure-exerting section, in particular in the seal region. In this way, sliding through can be prevented.

Advantageously, associated with the housing, at least one radially inner pressure-exerting section and/or at least one radially outer pressure-exerting section, each in the shape of a rib, can be realized. Ribs can also be realized in a simple way.

Advantageously, at least one radially inner pressure-exerting section and/or at least one radially outer pressure-exerting section can extend circumferentially at least in sections relative to the axis. In this way, the at least one seal can be held and/or pressed on circumferentially, in particular uniformly.

Advantageously, at least one radially outer pressure-exerting section can be realized as a sealing lip. In this way, it is possible to improve the sealing function with it.

Advantageously, at least one radially inner pressure-exerting section can be realized as a holding rib. In this way, a holding function for holding the at least one seal can be realized with it.

Advantageously, the at least one first housing part can be designed as a housing pot. In the housing pot, the at least one filter element can be arranged.

Advantageously, the at least one second housing part can be designed as a housing hood. With the housing hood, the housing pot can be simply closed off. Advantageously, the at least one first housing part and the at least one second housing part can be connected to each other and correspondingly separated from each other relative to the axis in axial direction. In this way, the housing parts can be connected by a linear movement. Advantageously, the at least one filter element can be inserted relative to the axis in axial direction into at least one of the housing parts, in particular the at least one first housing part, preferably the housing pot, and correspondingly removed.

Advantageously, the at least one first housing part and the at least one second housing part each can comprise at least one passage for fluid, in particular an inlet or an outlet. The at least one filter element can be arranged between the two housing parts such that the at least one inlet is separated from the at least one outlet.

Advantageously, at least one part of the at least one seal can be arranged adjacent to the filter bellows, when viewed axially relative to the axis. In this way, the installation space required by the filter element as a whole in axial direction can be reduced. In this way, also the at least one axially acting sealing surface, viewed in axial direction, can be arranged closer to a corresponding end face of the filter bellows. The sealing plane as a whole can be arranged deeper toward the filter bellows. In this way, more filter surface can be realized with a comparable required installation space. In case of a filter bellows with folded filter medium, greater fold heights can thus be realized. In addition or alternatively, a pressure loss can be reduced since for the at least one filter element less installation space is required.

Advantageously, a ratio between the axial spacing between the base of the groove and the sealing surface, on the one hand, and an axial spacing between the base of the groove and the free rim of the seal projection, on the other hand, can amount to between approximately 1 to 0.1 and 1 to 0.4, in particular approximately 1 to 0.28. In this way, a significant axial size difference between the seal projection and the seal section can be enabled.

Advantageously, the at least one seal can be foamed, in particular foamed at and/or on the filter bellows. Advantageously, the seal can comprise or be comprised of free-foaming material, in particular polyurethane (PUR). Advantageously, the at least one seal can be at least partially elastic. In this way, tolerances and/or vibrations can be compensated better.

Advantageously, the filter element, in particular the at least one seal can comprise, viewed relative to the axis in axial direction, an angular, in particular a rectangular, round, oval or different kind of circumference. When Aradial spacings@ or Aspacings viewed in radial direction from the interior to the exterior@ or Aspacings viewed in radial direction from the exterior to the interior@ is referred to, this concerns the corresponding spacings in direction perpendicular to the lines or surfaces spaced apart from each other, viewed in radial direction from the interior to the exterior or vice versa. In case that the filter element, in particular the seal, comprises a round circumference, this direction can correspond to a radius relative to the axis so that the corresponding spacings can also be referred to as radial spacings.

Advantageously, the filter element and the filter device can be used for cleaning air, gas, fuel, oil, water, aqueous urea solution or the like. The filter element and the filter device can be used in connection with an internal combustion engine of a motor vehicle. The invention is however not limited to internal combustion engines of motor vehicles. Instead, it can also be used in other kinds of fluid systems, in particular gas systems, air systems, clean air systems, hydraulic systems, cooling systems, fluid systems with the aqueous urea solution or the like, of motor vehicles or other machines, in particular agricultural machines or construction machines. The filter element and the filter device can also be used outside of automotive technology, in particular in industrial motors.

Advantageously, the filter device can be an air filter. The air filter can advantageously be part of an air intake manifold of an internal combustion engine. It can serve for purifying combustion air which is supplied to the internal combustion engine. The air filter can also be a cabin filter.

In an advantageous embodiment, an axial spacing between the holding surface and the sealing surface can be greater than an axial thickness of the radial fastening section. In this way, the at least one seal, viewed in a direction away from the edge of the filter bellows, can be widened. In this way, a risk can be reduced that the seal can slide through a free space between the housing-associated inner pressure-exerting section and the housing-associated outer pressure-exerting section.

Advantageously, a ratio between the axial spacing between the holding surface and the sealing surface, on the one hand, and the axial thickness of the radial fastening section, on the other hand, can amount to approximately between 1 to 0.3 and 1 to 0.5, in particular approximately 1 to 0.4.

In a further advantageous embodiment, a ratio between an axial length of the axial fastening section and to an axial spacing between the edge of the filter bellows and the sealing surface can amount to approximately between 1 to 1.2 and 1 to 1.7, in particular approximately 1 to 1.5. In this way, between the holding surface and the sealing surface a correspondingly large step can be realized which can further make more difficult sliding through of the at least one seal through the free region between the housing-associated inner pressure-exerting section and a housing-associated outer pressure-exerting section.

In a further advantageous embodiment, an axial spacing between the edge of the filter bellows and the base of the groove can be smaller than an axial spacing between the edge of the filter bellows and the sealing surface. In this way, the outer pressure-exerting section can engage correspondingly deep into the groove.

Advantageously, a ratio between an axial spacing between the edge of the filter bellows and the base of the groove, on the one hand, and an axial spacing between the edge of the filter bellows and the sealing surface, on the other hand, can amount to approximately between 1 to 1.5, and 1 to 2.2, in particular approximately 1 to 1.9.

In a further advantageous embodiment, an axial height of the groove at its radially inner circumferential side can be smaller than a width of the groove, viewed in a radial direction from the interior to the exterior, in the region of its base and/or an axial spacing between the base of the groove and the edge of the filter bellows and/or a thickness of the axial fastening section, viewed in a radial direction from the interior to the exterior, and/or an axial thickness of the radial fastening section and/or an axial spacing between the edge of the filter element and the sealing surface. In this way, a compact configuration of the at least one seal can be improved as a whole. In this context, one or several of the aforementioned conditions can be fulfilled.

Advantageously, a ratio between an axial height of the groove at its radially inner circumferential side and an axial spacing between the base of the groove and the free rim of the axial seal projection can amount to approximately between 1 to 2.7 and 1 to 3.2, in particular approximately 1 to 3.

Advantageously, a ratio between an axial height of the groove at its radially inner circumferential side and a width of the groove, viewed in a radial direction from the interior to the exterior, in the region of its base can amount to between approximately 1 to 2.7 and 1 to 3.2, in particular approximately 1 to 3.

Advantageously, a ratio between the axial height of the groove at its radially inner circumferential side and the axial spacing between the base of the groove and the edge of the filter bellows can amount to between approximately 1 to 3.5 and 1 to 4, in particular approximately 1 to 3.7.

Advantageously, a ratio between the axial height of the groove at its radially inner circumferential side and an axial length of the axial fastening section can amount to between approximately 1 to 4.5 and 1 to 5, in particular approximately 1 to 4.7.

Advantageously, a ratio between the axial height of the groove at its radially inner circumferential side and an axial thickness of the radial fastening section can amount to between approximately 1 to 1.7 and 1 to 2.2, in particular approximately 1 to 2.

Advantageously, a ratio between the axial height of the groove at its radially inner circumferential side and an axial spacing between the rim of the filter element and the sealing surface can amount to between approximately 1 to 6 and 1 to 8, in particular approximately 1 to 7.

Moreover, the technical object in case of the filter housing according to the invention is solved in that an axial spacing between the radially outer pressure-exerting surface and the at least one sealing surface is greater than a spacing between the radially outer pressure-exerting surface and the radially inner pressure-exerting surface.

According to the invention, between the radially outer pressure-exerting surface and the radially inner pressure-exerting surface a gap is realized through which the at least one seal can project. The gap extends at a slant to the axis and at a slant to a plane perpendicular to the axis. The dimension of the seal chamber in axial direction is greater than the gap. In this way, a part of the seal with a greater expansion than in the gap can be arranged in the seal chamber. In this way, it can be prevented that the seal can be pulled out of the seal chamber when the filter element is mounted.

Advantageously, a ratio of the axial spacing between the radially outer pressure-exerting surface and the at least one sealing surface, on the one hand, and the spacing between the radially outer pressure-exerting surface and the radially inner pressure-exerting surface, on the other hand, can amount to between approximately 1 to 0.7 and 1 to 0.9, in particular approximately 1 to 0.82.

Advantageously, the circumferential wall can project past at least one part of the seal chamber provided for receiving the at least one seal in axial direction relative to the axis. The circumferential wall can project past at least the receiving region of the seal chamber for the seal, i.e., at least the one seal. In this way, the at least one seal and the seal chamber can be protected better relative to the environment. Moreover, the circumferential wall can rest in this way against a corresponding section of the first housing part, in particular a corresponding boundary section, so that the stability of the filter housing as a whole can be increased.

Advantageously, the circumferential wall can surround in radial direction outwardly a circumferential boundary section of the at least one first housing part that delimits axially the seal chamber.

In an advantageous embodiment, at least one housing part, in particular the at least one first housing part, can comprise at least one centering section. With the at least one centering section, the respective other housing part, in particular the at least one second housing part, and/or the at least one seal and/or the at least one filter element can be centered and/or positioned.

With the at least one centering section, the housing parts in particular upon assembly can be positioned relative to each other, centered, and held in this position. In this way, forces acting between the at least two housing parts can be handled and/or introduced better. In this way, a risk can be reduced that the at least one seal is exposed to possible relative movements between the two housing parts. Due to such relative movement, the at least one seal can become damaged or even destroyed, in particular can tear.

Moreover, with the at least one centering section, centering between at least one housing part, in particular at least one first housing part, and the at least one filter element can be realized. With the centering action, the respective other housing part, in particular the second housing part, can be positioned with the at least one filter element more reproducibly, in particular always identically. In this way, error tolerances in case of a possible air mass measurement and by means of a sensor which is mounted in one of the housing parts, in particular the at least one second housing part, in particular an air mass meter (HFM), can be reduced.

Advantageously, a plurality of centering sections can be arranged distributed circumferentially relative to the axis. In this way, a more uniform centering action, holding, and/or positioning can be realized.

Advantageously, at least one centering section can be realized as a centering rib. Centering ribs can be constructed in a simple and/or space-saving way. At least one centering rib can advantageously extend relative to the axis in radial direction from the interior to the exterior and axially.

Advantageously, the at least one first housing part can comprise at least one centering section, in particular a centering rib, which is arranged radially outside of the outer pressure-exerting section at the radially outer circumferential side.

Advantageously, the at least one centering section can be supported at the radially inner circumferential side of the circumferential wall of the at least one second housing part.

Advantageously, the at least one centering section can be arranged at least partially outside and/or at least partially inside of the seal chamber. At least one centering section can be located exclusively inside, exclusively outside, or partially inside and partially outside of the seal chamber.

In a further advantageous embodiment, an axial spacing between the outer pressure-exerting surface at the sealing surface can be smaller than an axial spacing between the sealing surface and the free rim of the circumferential wall. In this way, between the outer pressure-exerting surface and the free rim of the circumferential wall a free space can be realized which can be used for receiving the seal projection of the at least one seal and/or possible centering sections.

Advantageously, a ratio between the axial spacing between the outer pressure-exerting surface and the sealing surface relative to the axial spacing between the sealing surface and the free rim of the circumferential wall can amount to approximately between 1 to 2.5 and 1 to 3, in particular approximately 1 to 2.8. Advantageously, a ratio between the axial spacing between the outer pressure-exerting surface and the sealing surface, on the one hand, and a smallest spacing, viewed in radial direction from the interior to the exterior, between a radially outer circumferential side of the inner pressure-exerting section and a radially inner circumferential side of the circumferential wall, on the other hand, can amount to approximately between 1 to 1.1 and 1 to 1.3, in particular approximately 1 to 1.2.

In a further advantageous embodiment, a ratio between an axial spacing between the inner pressure-exerting surface and the sealing surface, on the one hand, and an axial spacing between the inner pressure-exerting surface and the outer pressure-exerting surface, on the other hand, can amount to between approximately 1 to 1 and 1 to 1.2, in particular approximately 1 to 1.1.

In a further advantageous embodiment, a ratio between an axial spacing between the inner pressure-exerting surface and the outer pressure-exerting surface, on the one hand, and a spacing, viewed in radial direction from the exterior to the interior, between the radially inner circumferential side of the outer pressure-exerting section and the radially outer circumferential side of the inner pressure-exerting section, on the other hand, can amount to between approximately 1 to 0.7 and 1 to 0.9, in particular approximately 1 to 0.8.

In a further advantageous embodiment, a smallest spacing, viewed in radial direction from the interior to the exterior, between a radially outer circumferential side of the outer pressure-exerting section and a radially inner circumferential side of the circumferential wall and a spacing, viewed in radial direction from the interior to the exterior, between a radially outer circumferential side of the inner pressure-exerting section and a radially inner circumferential side of the outer pressure-exerting section can be approximately of the same size.

Advantageously, a spacing, viewed in radial direction from the exterior to the interior, of the radially inner circumferential side of the circumferential wall in the region of its free rim relative to the radially outer circumferential side of the inner pressure-exerting section can be greater than a spacing, viewed in radial direction from the exterior to the interior, of the radially inner circumferential side of the circumferential wall in the region of the sealing surface relative to the radially outer circumferential side of the inner pressure-exerting section. In this way, the circumferential wall can widen in a funnel shape in axial direction toward its free rim. In this way, pushing the second housing part onto the first housing part can be facilitated.

Advantageously, a ratio between a spacing, viewed in radial direction from the exterior to the interior, of the radially inner circumferential side of the circumferential wall in the region of its free rim relative to the radially outer circumferential side of the inner pressure-exerting section, on the one hand, and a spacing, viewed in radial direction from the exterior to the interior, of the radially inner circumferential side of the circumferential wall in the region of the sealing surface relative to the radially outer circumferential side of the inner pressure-exerting section, on the other hand, can amount to between approximately 1 to 0.7 and 1 to 0.8, in particular approximately 1 to 0.75.

Advantageously, an axial spacing between a side of at least one possible centering section that is facing the sealing surface and the free rim of the circumferential wall can be smaller than an axial spacing between the corresponding side of the at least one centering section and the sealing surface.

Advantageously, a ratio between the axial spacing between a side of the at least one centering section that is facing the sealing surface and the free rim of the circumferential wall, on the one hand, and an axial spacing between the corresponding side of the at least one centering section and the sealing surface, on the other hand, can amount to between approximately 1 to 1.3 and 1 to 1.7, in particular approximately 1 to 1.5.

Advantageously, an axial spacing between the inner pressure-exerting surface and the free rim of the circumferential wall can be greater than a spacing, viewed in radial direction from the interior to the exterior, between the radially outer circumferential side of the inner pressure-exerting section and the radially inner circumferential side of the circumferential wall in the region of its free rim.

Advantageously, a ratio of an axial spacing between the inner pressure-exerting surface and the free rim of the circumferential wall and a spacing, viewed in radial direction from the interior to the exterior, between the radially outer circumferential side of the inner pressure-exerting section and the radially inner circumferential side of the circumferential wall in the region of its free rim can amount to approximately between 1 to 0.6 and 1 to 0.8, in particular approximately 1 to 0.7.

Advantageously, a ratio between a spacing, viewed in radial direction from the exterior to the interior, between a location of the circumferential wall which relative to the axis is radially farthest inwardly positioned and a location of the circumferential wall which is radially farthest outwardly positioned and an axial spacing between the sealing surface and the free rim of the circumferential wall can amount to approximately between 1 to 15 and 1 to 17, in particular approximately 1 to 16.

In a further advantageous embodiment, an axial spacing between at least one centering section and the outer pressure-exerting surface can be smaller than an axial spacing between the outer pressure-exerting surface and the sealing surface.

Advantageously, a ratio between an axial spacing between at least one centering section and the outer pressure-exerting surface, on the one hand, and an axial spacing between the outer pressure-exerting surface and the sealing surface, on the other hand, can amount to approximately between 1 to 1.4 and 1 to 1.6, in particular approximately 1 to 1.5.

Advantageously, a smallest spacing, viewed in radial direction from the interior to the exterior, between the radially outer circumferential side of the inner pressure-exerting section and the radially inner circumferential side of the circumferential wall can be smaller than an axial spacing between the sealing surface and the at least one centering section.

Advantageously, a ratio between a smallest spacing, viewed in radial direction from the interior to the exterior, between the radially outer circumferential side of the inner pressure-exerting section and the radially inner circumferential side of the circumferential wall, on the one hand, and an axial spacing between the sealing surface and the at least one centering section, on the other hand, can amount to approximately between 1 to 1.3 and 1 to 1.5, in particular approximately 1 to 1.4.

Advantageously, a ratio between an axial spacing between the outer pressure-exerting surface and the sealing surface, on the one hand, and an axial spacing between the outer pressure-exerting surface and the free rim of the circumferential wall, on the other hand, can amount to between approximately 1 to 1.6 and 1 to 2, in particular approximately 1 to 1.8.

Moreover, the technical object is solved with the filter device by a filter housing according to the invention in which at least one filter element according to the invention is arranged such that it separates the at least one inlet from the at least one outlet and the at least one seal of the at least one filter element is arranged in the seal chamber of the filter housing.

In other respects, the features and advantages discussed in connection with the filter element according to the invention, the filter housing according to the invention, and the filter device according to the invention, and their respective advantageous embodiments apply correspondingly among each other and vice versa. The individual features and advantages can, of course, be combined among each other, wherein further advantageous effects may result which surpass the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will expediently consider the features, disclosed in combination in the drawing, the description, and the claims, also individually and combine them to further meaningful combinations.

In the Figures, same components are provided with same reference characters.

DESCRIPTION OF PREFERRED EMBODIMENTS

In the FIGS. 1 to 7, a filter device in the form of an air filter 10 is illustrated in different perspective views, section views, and detail views. The air filter 10 can be arranged in an intake manifold of an internal combustion engine of a motor vehicle for purifying combustion air.

The air filter 10 comprises an air filter housing 12 with an inlet 14 for air to be purified and an outlet 16 for purified air. In the air filter housing 12, a filter element 16 is exchangeably arranged such that it separates the inlet 14 from the outlet 16. In the plan view viewed axially to an axis 20, the air filter housing 12 has, for example, an approximately rectangular circumference.

The axis 20 coincides in the embodiment with a housing axis of the air filter housing 12, an installation/removal axis of the filter element 18 in a housing pot 22 of the air filter housing 12, a connecting axis of a housing hood 24 of the air filter housing 12 with the housing pot 22, and an element axis of the filter element 18. For better clarity, in the following the element axis, the housing axis, the connecting axis, and the installation/removal axis are identified with same reference character 20 and are referred to as axis 20 for short. It is understood that when the filter element 18 is removed, depending on the context, the housing axis, the element axis and/or the installation/removal axis may be referred to. When in the following Aradial@, Acoaxial@, Aaxial@, Atangential@, Acircumferential@, Aconcentric@, Aeccentric@ or the like is referred to, this relates to the axis 20, if nothing to the contrary is indicated.

Figure 1:
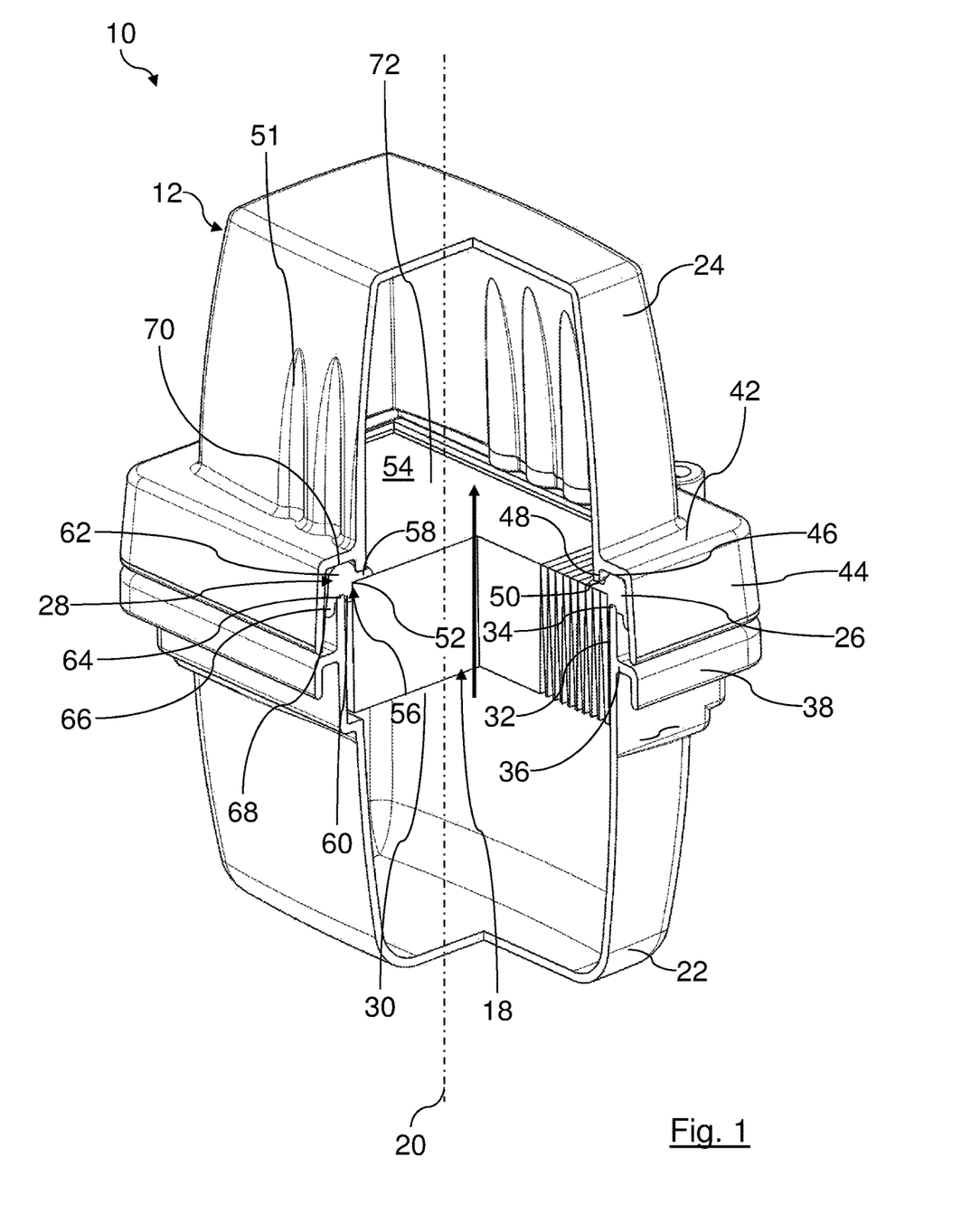
FIG. 1 shows an isometric partial section view of an air filter with a filter housing in which a filter element is arranged.
Figure 2:
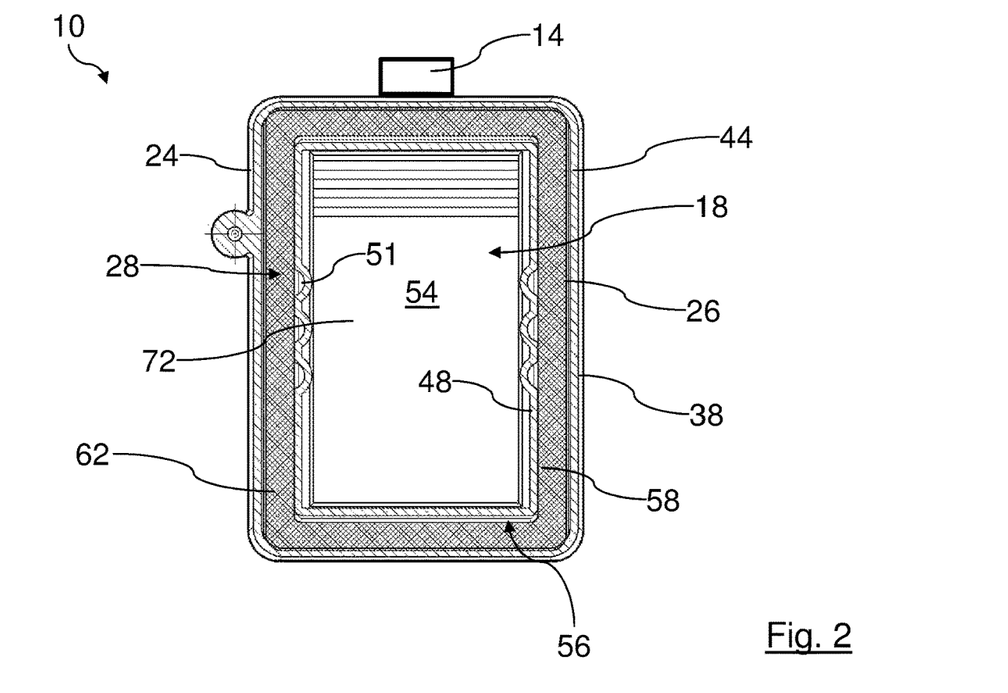
FIG. 2 shows a cross section view of the air filter of FIG. 1 through a seal chamber between a housing pot and a housing hood along a section line II-II of FIG. 4.
Figure 3:
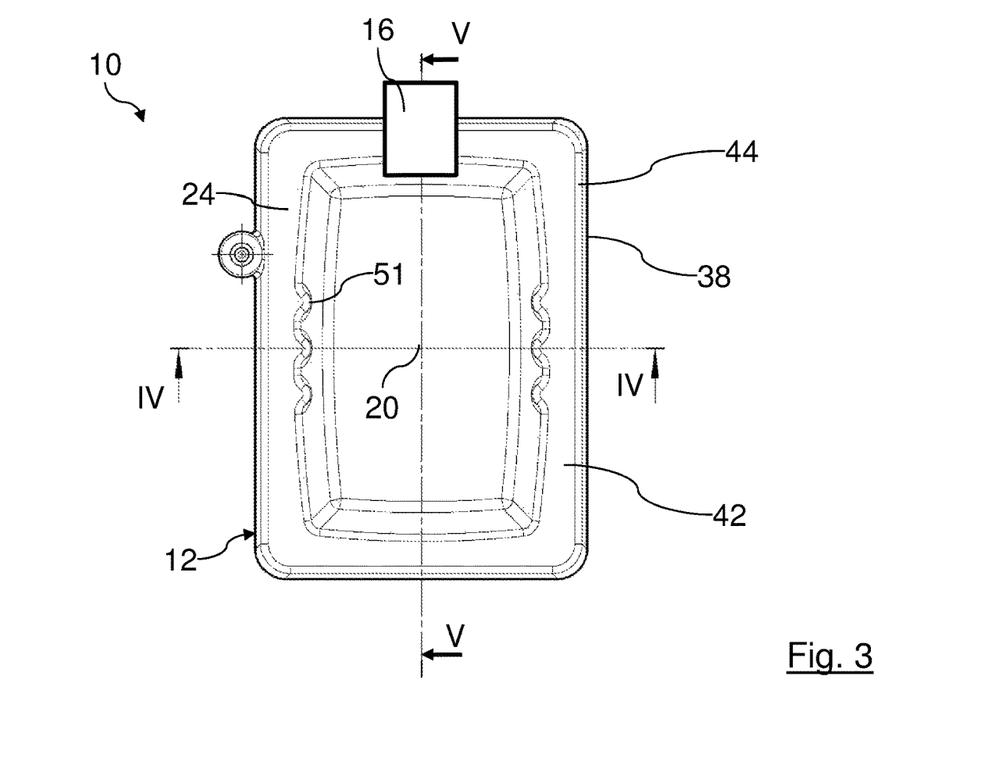
FIG. 3 is a plan view of the air filter of FIG. 1.
Figure 4:
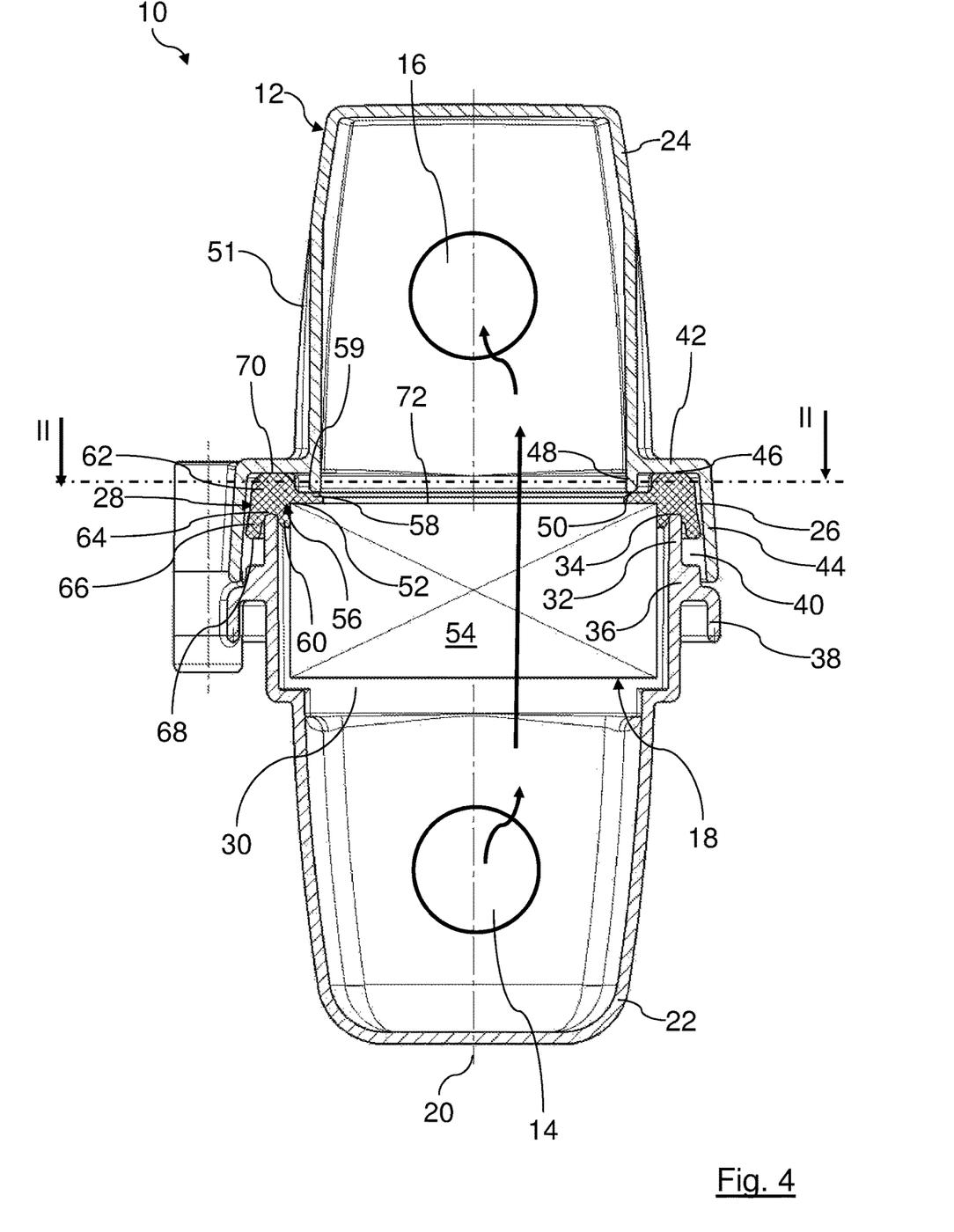
FIG. 4 shows a first longitudinal section of the air filter of FIGS. 1 and 3 along a section line IV-IV of FIG. 3.
Figure 5:
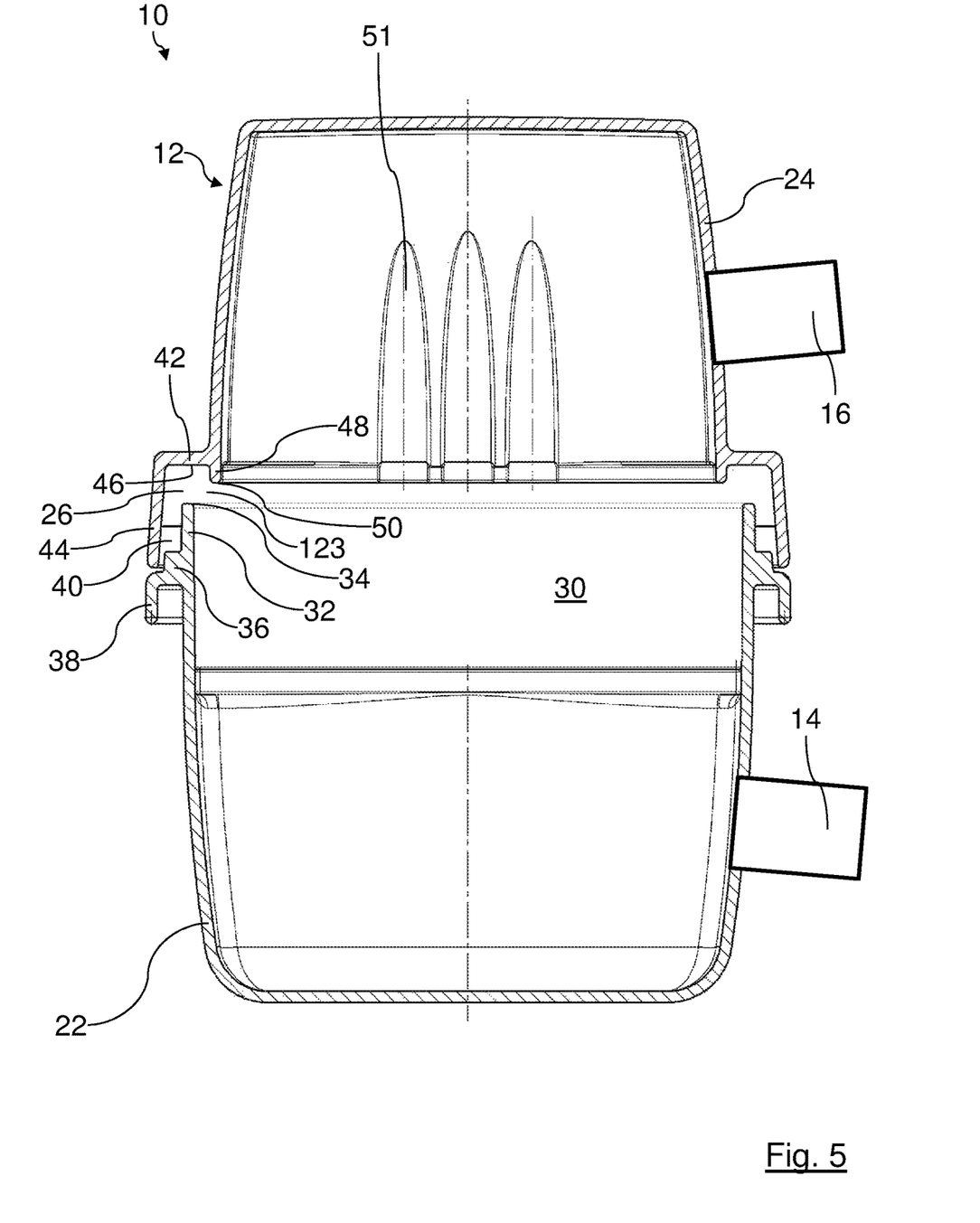
FIG. 5 shows a second longitudinal section of the air filter of FIGS. 1 and 3 along a section line V-V of FIG. 3, here without filter element.

The air filter housing 12 comprises the housing pot 22, in the FIGS. 1, 4, and 5 at the bottom, which is closed off by the housing hood 24 at the top. The housing hood 24 is separably connected to the housing pot 22. The housing hood 24 is placed with its free rim onto the open side of the housing pot 22 in axial direction.

In the region of their respective open sides, the housing pot 22 and the housing hood 24 delimit a circumferentially extending seal chamber 26. The seal chamber 26 serves for receiving a circumferential seal 28 of the filter element 18. The seal 28 is arranged in the seal chamber 26 between the housing pot 22 and the housing hood 24.

The inlet 14 is arranged in a side wall of the housing pot 22. The outlet 16 is located in a corresponding side wall of the housing hood 24. The inlet 14 and the outlet 16 can also be arranged at other locations of the housing pot 22 and the housing hood 24. In case of an reversal of the flow direction, the inlet 14 can also serve as outlet and the outlet 16 as inlet.

In the region of its open side, the housing pot 22 comprises a cross-sectionally widened region which forms a receiving chamber 30 for the filter element 18.

The circumferential rim of the housing pot 22 at its free side forms a radially outer pressure-exerting section 32 in the form of a sealing rib for the seal 28. The outer pressure-exerting section 32 extend circumferentially parallel to the axis 20, i.e., axially. The outer pressure-exerting section 32 delimits the seal chamber 26 in radial direction inwardly. The axial end face of the outer pressure-exerting section 32 forms a radially outer pressure-exerting surface 34. The outer pressure-exerting surface 34 extend circumferentially and radially.

At the side which is axially facing away from the outer pressure-exerting surface 34, the outer pressure-exerting section 32 passes as one piece into a circumferential boundary section 36. The boundary section 36 is stepped twice in radially outward direction. The boundary section 36 delimits the seal chamber 26 at the corresponding axial end face.

Adjacent to its second step, the boundary section 36 passes into a circumferential collar 38. The collar 38 extend circumferentially and axially away from the housing hood 24.

At the axial end face of the boundary section 36 facing the housing hood 24, a plurality of centering sections 40 in the form of centering ribs are arranged at the radially outer circumferential side of the outer pressure-exerting section 32. The centering sections 40 are arranged circumferentially distributed. They extend respectively approximately perpendicularly to the radially outer circumferential side of the outer pressure-exerting section 32 in radial direction from the interior to the exterior and in axial direction.

The housing hood 24 in the region of its open side is stepped in radially outward direction. A section extending circumferentially and in radial direction from the interior to the exterior serves as a sealing section 42. A circumferential wall 44 adjoins as one piece the sealing section 42 in radial direction outwardly. The circumferential wall 44 extend circumferentially and at a slight slant relative to the axis 20. The circumferential wall 44 is located at the side of the sealing section 42 which is axially facing the housing pot 22.

The circumferential wall 44 opens, slightly funnel-shaped, toward its free rim. When the air filter housing 12 is closed, the circumferential wall 44 delimits the seal chamber 26 in radially outward direction.

An axially inner side of the sealing section 42 forms a sealing surface 46. The sealing surface 46 extend circumferentially in radial direction from the interior to the exterior. The seal 28 can seal-tightly rest against the sealing surface 46 in axial direction.

Radially within the sealing section 42, a radially inner pressure-exerting section 48 in the form of a holding rib is provided. The inner pressure-exerting section 48 extends circumferentially and approximately parallel to the axis 20, i.e., parallel to the outer pressure-exerting section 32. The inner pressure-exerting section 48 delimits the seal chamber 26 in radial direction inwardly at the housing hood 24. An end face of the inner pressure-exerting section 48 that is facing the housing pot 22 forms a radially inner pressure-exerting surface 50.

The radially inner pressure-exerting section 48 is located radially inside of the radially outer pressure-exerting section 32. The inner pressure-exerting surface 50 and the outer pressure-exerting surface 34 are axially as well as radially spaced apart from each other.

A gap 123 between the inner pressure-exerting surface 50 and the outer pressure-exerting surface 34 forms a passage for a part of the seal 28. The seal chamber 26 is delimited outside of the gap 123 by the sealing section 42, the circumferential wall 44, the boundary section 36, the outer pressure-exerting section 32, and the inner pressure-exerting section 48.

The circumferential wall 44 projects past the seal chamber 26 in the region of the space provided for the seal 28 and in the region with the centering sections 40. Moreover, the circumferential wall 44 projects past a part of the boundary section 36 of the housing part 22.

When the air filter housing 12 is mounted, the circumferential wall 44 is resting with its radially inner circumferential side against the radially outer side of the centering ribs 40, respectively. In this way, the housing hood 24 is centered on the housing pot 22.

Moreover, the housing hood 24 is provided in oppositely positioned side walls with three radially inwardly projecting, axially extending elongate depressions 51, respectively.

The seal 28 will be explained in the following in more detail with the aid of FIG. 5. The seal 28 is a polyurethane seal which is foamed onto an end face edge 52 of a filter bellows 54 of the filter element 18. As a whole, the seal 28 is constructed as one piece. In the illustrated embodiment, an end face 72 of the filter bellows 54 with the seal 28 forms a raw side of the filter element 18. The axially oppositely positioned end face forms a clean side. In reverse flow direction, the seal 28 can alternatively also be located at the clean side.

The filter bellows 54 comprises in an exemplary fashion a zigzag-folded filter medium, for example, a filter nonwoven. The filter bellows 54 has an approximately quadrangular configuration. It can be designed, for example, as a so-called flat filter element.

The seal 28 projects past the edge 52 of the filter bellows 54 in axial direction as well as viewed in radial direction from the interior to the exterior.

The seal 28 comprises a circumferential fastening region 56 with which it is fastened to the filter bellows 54. The fastening region 56 comprises a circumferential radial fastening section 58 and a circumferential axial fastening section 60.

The radial fastening section 58 extend circumferentially and substantially transverse to the axis 20 in radial direction from the interior to the exterior. At its side which is axially facing away from the filter bellows 54, the radial fastening section 58 comprises a holding surface 59. The axial fastening section 60 extend circumferentially and substantially parallel, i.e., axially to the axis 20. The fastening region 56 engages around the edge 52 of the filter bellows 54 with the radial fastening section 58 and the axial fastening section 60.

A circumferential seal region 62 adjoins the fastening region 56 in radially outward direction. A rear side of the axial fastening section 60 which is facing away from the filter bellows 54 forms a radially inner boundary of a circumferential groove 64 for receiving the radially outer pressure-exerting section 32 of the housing pot 22.

At its radially outer circumferential side, the groove 64 is delimited by a circumferential seal projection 66 of the seal 28. The seal projection 66 extends approximately axially, at a slight slant relative to the axis 20. The seal projection 66 projects past the axial fastening section 60 in axial direction.

When the air filter 10 is mounted, a free rim 68 of the seal projection 66 ends approximately at the level of the centering sections 40.

At the exterior side of the seal region 62 of the seal 28 that is axially positioned opposite the groove 64, an axially acting circumferential sealing surface 70 is arranged. The sealing surface 70 is located at a greater axial spacing to the end face 72 of the filter bellows 54 than the inner pressure-exerting surface 50.

When the air filter element 10 is mounted, the outer pressure-exerting section 32 engages circumferentially the groove 64. The outer pressure-exerting surface 34 presses the seal region 62 in axial direction against the sealing section 42 of the housing hood 24 and ensures in this way an axial seal-tight contact of the sealing surface 70 at the sealing surface 46. Also, the inner pressure-exerting section 48 presses in axial direction against the radial fastening section 58 of the seal 28 and clamps in this way the seal 28 opposite the outer pressure-exerting section 32.

Figure 6:
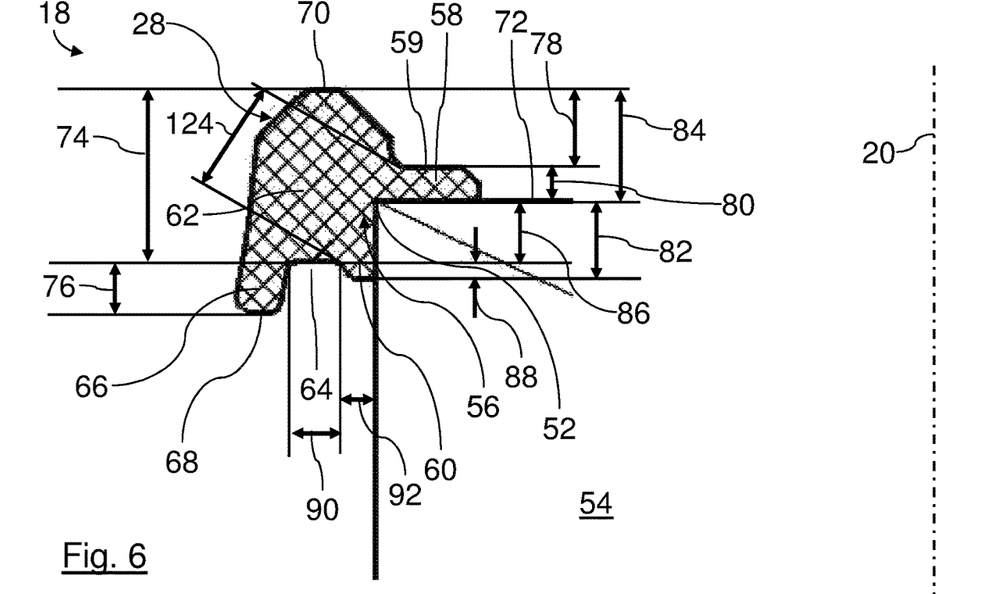
FIG. 6 shows a detail view true to scale of a longitudinal section of the filter element of the air filter in the region of a seal.
Figure 7:
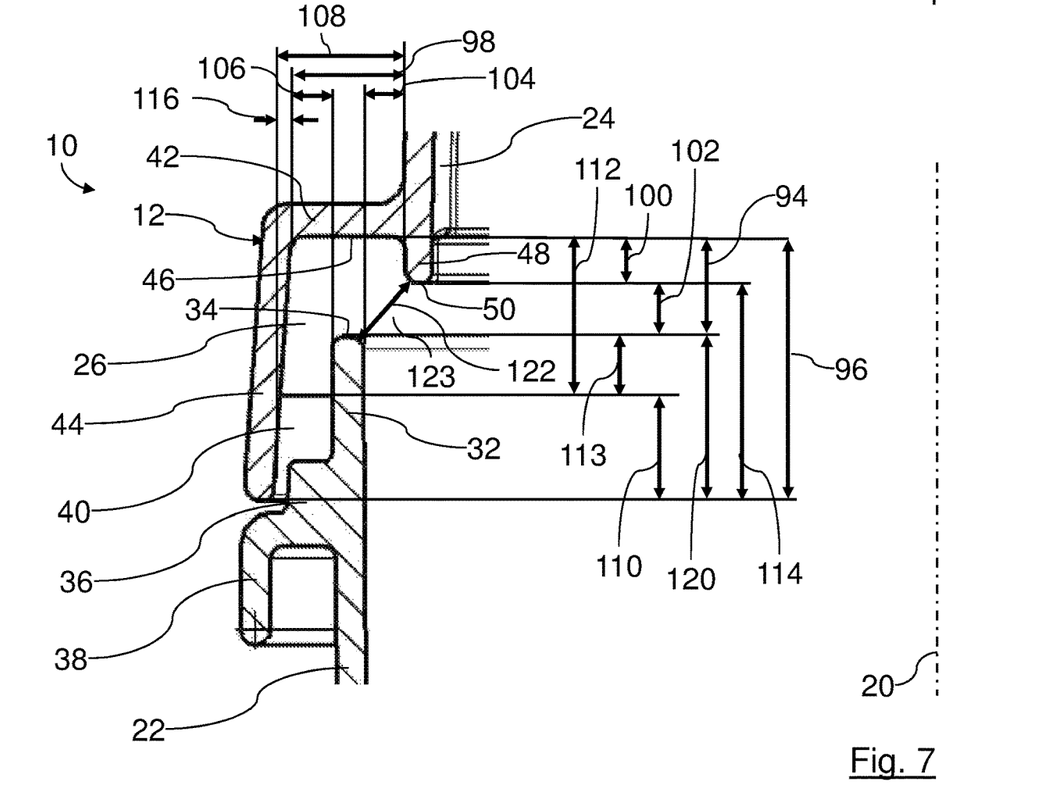
FIG. 7 shows a detail view true to scale of the longitudinal section of the air filter without filter element of FIG. 5 in the region of a seal chamber.

In the following, in an exemplary fashion some proportions of the air filter housing 12 and the seal 28 are illustrated with the aid of FIGS. 6 and 7. Further proportions can be taken from the illustrations of FIGS. 6 and 7 which are true to scale.

An axial spacing 74 between the base of the groove 64 and the sealing surface 70 is greater than a spacing 124 between a transition of the base of the groove 64 into the axial fastening section 60 and a transition of the holding surface 59 into the seal region 62.

A ratio between the axial spacing 74 between the base of the groove 64 and the sealing surface 70, on the one hand, and the spacing 124 between the transition of the base of the groove 64 into the axial fastening section 60 and the transition of the holding surface 59 into the seal region 62, on the other hand, amounts to approximately 1 to 0.66.

An axial spacing 74 between a base of the groove 64 and the sealing surface 70 is greater than an axial spacing 76 between the base of the groove 64 and the free rim 68 of the seal projection 66. A ratio between the axial spacing 74 between the base of the groove 64 and the sealing surface 70, on the one hand, and an axial spacing 76 between the base of the groove 64 and the free rim 68 of the seal projection 66, on the other hand, amounts to approximately 1 to 0.28.

An axial spacing 78 between the holding surface 59 and the sealing surface 70 is greater than an axial thickness 80 of the radial fastening section 58. A ratio between the axial spacing 78 between the holding surface 59 and the sealing surface 70, on the one hand, and the axial thickness 80 of the radial fastening section 58, on the other hand, amounts to approximately 1 to 0.4.

A ratio between an axial length 82 of the axial fastening section 60 and an axial spacing 84 between the edge 52 of the filter bellows 54 and the sealing surface 70 amounts to approximately 1 to 1.5.

An axial spacing 86 between the edge 52 of the filter bellows 54 and the base of the groove 64 is smaller than the axial spacing 84 between the edge 52 of the filter bellows 54 and the sealing surface 70. A ratio between the axial spacing 86 between the edge 52 of the filter bellows 54 and the base of the groove 64, on the one hand, and the axial spacing 84 between the edge 52 of the filter bellows 54 and the sealing surface 70, on the other hand, amounts to approximately 1 to 1.9.

An axial height 88 of the groove 64 at its radially inner circumferential side is smaller than a width 90 of the groove 64, viewed in radial direction from the interior to the exterior, in the region of its base. The axial height 88 of the groove 64 at its radially inner circumferential side is smaller than the axial spacing 86 between the base of the groove 64 and the edge 52 of the filter bellows 54. The axial height 88 of the groove 64 at its radially inner circumferential side is smaller than a thickness 92 of the axial fastening section 60, viewed in radial direction from the interior to the exterior. The axial height 88 of the groove 64 at its radially inner circumferential side is smaller than the axial thickness 80 of the radial fastening section 58. The axial height 88 of the groove 64 at its radially inner circumferential side is smaller than the axial spacing 84 between the edge 52 of the filter bellows 54 and the sealing surface 70.

A ratio between the axial height 88 of the groove 64 at its radially inner circumferential side and the axial spacing 76 between the base of the groove 64 and the free rim 68 of the axial seal projection 66 amounts to approximately 1 to 3.

A ratio between the axial height 88 of the groove 64 at its radially inner circumferential side and the width 90 of the groove 64, viewed in radial direction from the interior to the exterior, in the region of its base amounts to approximately 1 to 3.

A ratio between the axial height 88 of the groove 64 at its radially inner circumferential side and the axial spacing 86 between the base of the groove 64 and the edge 52 of the filter bellows 54 amounts to approximately 1 to 3.7. A ratio between the axial height 88 of the groove 64 at its radially inner circumferential side relative to the axial length 82 of the axial fastening section 60 amounts to approximately 1 to 4.7.

A ratio between the axial height 88 of the groove 64 at its radially inner circumferential side and the axial thickness 80 of the radial fastening section 58 amounts to approximately 1 to 2.

A ratio between the axial height 88 of the groove 64 at its radially inner circumferential side, on the one hand, and the axial spacing 84 between the edge 52 of the filter bellows 54 and the sealing surface 70, on the other hand, amounts to approximately 1 to 7.

An axial spacing 94 between the radially outer pressure-exerting surface 34 and the sealing surface 46 is greater than a spacing 122 between the radially outer pressure-exerting surface 34 and the radially inner pressure-exerting surface 50. A ratio of the axial spacing 94 between the radially outer pressure-exerting surface 34 and the sealing surface 46, on the one hand, and the spacing 122 between the radially outer pressure-exerting surface 34 and the radially inner pressure-exerting surface 50, on the other hand, amounts to approximately 1 to 0.82 The axial spacing 94 between the outer pressure-exerting surface 34 and the sealing surface 46 is smaller than an axial spacing 96 between the sealing surface 46 and a free rim of the circumferential wall 44. A ratio between the axial spacing 94 between the outer pressure-exerting surface 34 and the sealing surface 46, on the one hand, relative to the axial spacing 96 between the sealing surface 46 and the free rim of the circumferential wall 44, on the other hand, amounts to approximately 1 to 2.8.

A ratio between the axial spacing 94 between the outer pressure-exerting surface 34 and the sealing surface 46, on the one hand, and a smallest spacing 98, viewed in radial direction from the interior to the exterior, between a radially outer circumferential side of the inner pressure-exerting section 48 and a radially inner circumferential side of the circumferential wall 44, on the other hand, amounts to approximately 1 to 1.2.

A ratio between an axial spacing 100 between the inner pressure-exerting surface 50 and the sealing surface 46, on the one hand, and an axial spacing 102 between the inner pressure-exerting surface 50 and the outer pressure-exerting surface 34, on the other hand, amounts to approximately 1 to 1.1.

A ratio between the axial spacing 102 between the inner pressure-exerting surface 50 and the outer pressure-exerting surface 34, on the one hand, and a spacing 104, viewed in radial direction from the exterior to the interior, between the radially inner circumferential side of the outer pressure-exerting section 32 and the radially outer circumferential side of the inner pressure-exerting section 48, on the other hand, amounts to approximately 1 to 0.8.

A smallest spacing 106, viewed in radial direction from the interior to the exterior, between a radially outer circumferential side of the outer pressure-exerting section 32 and a radially inner circumferential side of the circumferential wall 44 and the spacing 104, viewed in radial direction from the interior to the exterior, between the radially outer circumferential side of the inner pressure-exerting section 48 and a radially inner circumferential side of the outer pressure-exerting section 32 are approximately of the same size.

A spacing 108, viewed in radial direction from the exterior to the interior, of the radially inner circumferential side of the circumferential wall 44 in the region of its free rim relative to the radially outer circumferential side of the inner pressure-exerting section 48 is greater than the spacing 98, viewed in radial direction from the exterior to the interior, of the radially inner circumferential side of the circumferential wall 44 in the region of the sealing surface 46 relative to the radially outer circumferential side of the inner pressure-exerting section 48. A ratio between the spacing 108, viewed in radial direction from the exterior to the interior, of the radially inner circumferential side of the circumferential wall 44 in the region of its free rim relative to the radially outer circumferential side of the inner pressure-exerting section 48, on the one hand, and the spacing 98, viewed in radial direction from the exterior to the interior, of the radially inner circumferential side of the circumferential wall 44 in the region of the sealing surface 46 relative to the radially outer circumferential side of the inner pressure-exerting section 48, on the other hand, amounts to approximately 1 to 0.75.

An axial spacing 110 between the sides of the centering sections 40 that are respectively facing the sealing surface 46 and the free rim of the circumferential wall 44 is smaller than an axial spacing 112 between the corresponding sides of the centering sections 40 and the sealing surface 46. A ratio between the axial spacing 110 between the sides of the centering sections 40 that are facing the sealing surface 46 and the free rim of the circumferential wall 44, on the one hand, and the axial spacing 112 between the corresponding sides of the centering sections 40 and the sealing surface 46, on the other hand, amounts to approximately 1 to 1.5.

An axial spacing 114 between the inner pressure-exerting surface 50 of the free rim of the circumferential wall 44 is greater than the spacing 108, viewed in radial direction from the interior to the exterior, between the radially outer circumferential side of the inner pressure-exerting section 48 and the radially inner circumferential side of the circumferential wall 44 in the region of its free rim. A ratio between the axial spacing 114 between the inner pressure-exerting surface 50 and the free rim of the circumferential wall 44, on the one hand, and the spacing 108, viewed in radial direction from the interior to the exterior, between the radially outer circumferential side of the inner pressure-exerting section 48 and the radially inner circumferential side of circumferential wall 44 in the region of its free rim, on the other hand, amounts to approximately 1 to 0.7.

A ratio between a spacing 116, viewed in radial direction from the exterior to the interior, between a location which, relative to the axis 20, is radially farthest inwardly positioned and a location that is radially farthest outwardly positioned of the circumferential wall 44 and the axial spacing 96 between the sealing surface 46 and the free rim of the circumferential wall 44 amounts to approximately 1 to 16.

An axial spacing between the centering sections 40 and the outer pressure-exerting surface 34 is smaller than the axial spacing 94 between the outer pressure-exerting surface 34 and the sealing surface 46. A ratio between the axial spacing between the centering sections 40 and the outer pressure-exerting surface 34, on the one hand, and the axial spacing 94 between the outer pressure-exerting surface 34 and the sealing surface 46, on the other hand, amounts to approximately 1 to 1.5.

The smallest spacing 98, viewed in radial direction from the interior to the exterior, between the radially outer circumferential side of the inner pressure-exerting section 48 and the radially inner circumferential side of the circumferential wall 44 is smaller than the axial spacing 112 between the sealing surface 46 and the centering sections 40.

A ratio between the smallest spacing 98, viewed in radial direction from the interior to the exterior, between the radially outer circumferential side of the inner pressure-exerting section 48 and the radially inner circumferential side of the circumferential wall 44, on the one hand, and the axial spacing 112 between the sealing surface 46 and the centering sections 40, on the other hand, amounts to approximately 1 to 1.4.

A ratio between the axial spacing 94 between the outer pressure-exerting surface 34 in the sealing surface 46, on the one hand, and an axial spacing 120 between the outer pressure-exerting surface 34 and the free rim of the circumferential wall 44, on the other hand, amounts to approximately 1 to 1.8.

For assembly, the filter element 18 with its filter bellows 54 leading is inserted axially into the housing pot 22. In doing so, the seal 28 is placed onto the outer pressure-exerting surface 34. Subsequently, the housing hood 24 is placed in axial direction onto the housing pot 22 such that the circumferential wall 44 is almost seated on the boundary section 36. In doing so, the circumferential wall 44 of the housing hood 24 is guided along the centering sections 40 and is thus moved into the correct position on the housing pot 22. The filter element 18 is moreover centered in the housing pot 22. In the end position, the seal region 62 of the seal 28 is clamped in axial direction between the outer pressure-exerting section 32 of the sealing section 42. Moreover, the radial fastening section 58 of the seal 28 is pushed with the inner pressure-exerting section 48 in axial direction into the receiving chamber 30. Due to the cross-sectionally widened fastening region 56, it is prevented that the seal 28, for example, in case of operation-caused pressure pulsations, can slide through the gap 123 between the inner pressure-exerting section 48 and the outer pressure-exerting section 32 out of the seal chamber 26.

What is claimed is:

1. A filter element for a fluid configured to be exchangeably arranged in a filter housing between at least one inlet and at least one outlet for the fluid, the filter element comprising:
    a filter bellows comprising at least one filter medium, the filter bellows having:
        a first axial flow face;
        an opposite second axial flow face;
            wherein axial, as used herein, is a direction of an element axis from the first axial flow face to the second axial flow face;
        a plurality of lateral side faces extend axially from the first axial flow face to the opposite second axial flow face;
        wherein an end face edge is an edge where the first axial flow face the filter bellows meets the plurality of lateral side faces;
    a circumferential seal arranged circumferentially relative to the element axis of the filter element on the end face edge of the filter bellows, the circumferential seal having an axial fastening leg extending on the plurality of lateral side faces from the end face edge, and a radial fastening leg extending on the first axial flow face from the axial fastening leg at the end face edge;
        wherein the axial fastening leg of the circumferential seal includes:
            a circumferential sealing axial projection spaced radially outwardly from the axial fastening leg; and
            a circumferential sealing groove arranged between the axial fastening leg and the circumferential sealing axial projection;
    wherein the radial fastening leg comprises a first rear side facing away from the filter bellows,
    wherein the first rear side forms a retaining surface configured to engage a radially inner pressure-exerting section of the filter housing;
    wherein the circumferential sealing groove is configured to receive a radially outer pressure-exerting section of the filter housing;
    wherein the circumferential seal further comprises a circumferential sealing axial projection forms a radially outer boundary of the circumferential sealing groove opposite the axial fastening leg,
    wherein the circumferential sealing projection, viewed in an axial direction along the element axis of the filter element, projects past the axial fastening leg;
    an axially acting circumferential sealing surface formed opposite the circumferential sealing groove on an axially outer side of the circumferential seal;
    wherein the axially acting circumferential sealing surface is axially spaced farther away from the first axial flow face of the filter bellows than the retaining surface of the radial fastening leg;
    wherein an axial spacing, measured between a base of the circumferential sealing groove and the axially acting circumferential sealing surface, is greater than a spacing measured between a transition of the base of the circumferential sealing groove into the axial fastening leg and the end face edge of the filter bellows;
    wherein an axial spacing, measured between the retaining surface and the axially acting circumferential sealing surface, is greater than an axial thickness of the radial fastening leg.

2. The filter element according to claim 1, wherein a ratio between an axial length of the axial fastening leg and an axial spacing, measured between the end face edge of the filter bellows and the axially acting circumferential sealing surface, amounts to between approximately 1 to 1.2 and 1 to 1.7.

3. The filter element according to claim 2, wherein said ratio amounts to approximately 1 to 1.5.

4. The filter element according to claim 1, wherein an axial spacing, measured between the end face edge of the filter bellows and the base of the circumferential groove, is smaller than an axial spacing, measured between the end face edge of the filter bellows and the axially acting circumferential sealing surface.

5. The filter element according to claim 1, wherein an axial height of the at least partially circumferential groove at a radially inner circumferential side of the circumferential groove is smaller than a width of the circumferential groove measured at the base of the circumferential sealing groove in the radial direction.

6. The filter element according to claim 5, wherein said axial height of the circumferential groove is smaller than an axial spacing, measured between the base of the circumferential groove and the end face edge of the filter bellows.

7. The filter element according to claim 5, wherein said axial height of the circumferential groove is smaller than a thickness of the axial fastening leg measured in the radial direction.

8. The filter element according to claim 5, wherein said axial height of the circumferential groove is smaller than an axial thickness of the radial fastening leg.

9. The filter element according to claim 5, wherein said axial height of the circumferential groove is smaller than an axial spacing measured between the end face edge of the filter bellows and the axially acting circumferential sealing surface.

10. A filter housing of a filter device, the filter housing comprising:
    at least one inlet for a fluid to be filtered and at least one outlet for filtered fluid, wherein the filter housing is configured to receive at least one exchangeable filter element arranged in the filter housing such that the at least one inlet is separated from the at least one outlet;
    at least one first housing part and at least one second housing part connected to each other to be at least partially separable from each other;
    wherein the at least one first housing part and the at least one second housing part delimit a seal chamber extending circumferentially relative to an axis of the filter housing and configured to receive at least one seal of the at least one filter element;
    wherein the at least one second housing part comprises at least one sealing surface oriented radially relative to the axis of the filter housing and configured to contact the at least one seal;

wherein the at least one first housing part comprises a radially outer pressure-exerting section, positioned axially opposite the at least one sealing surface of the at least one second housing part, wherein the radially outer pressure-exerting section comprises a radially outer pressure-exerting surface configured to press the at least one seal against the at least one sealing surface of the at least one second housing part;

wherein the at least one second housing part comprises at least one radially inner pressure-exerting section comprising a radially inner pressure-exerting surface, wherein the radially inner pressure-exerting surface is arranged radially inwardly relative to the at least one sealing surface of the at least one second housing part and is configured to press the at least one filter element axially relative to the axis of the filter housing;

wherein the at least one second housing part further comprises a circumferential wall delimiting radially outwardly the seal chamber, wherein the circumferential wall is arranged radially outwardly relative to the at least one sealing surface of the at least one second housing part and radially outwardly relative to the radially outer pressure-exerting section of the at least one first housing part;

wherein an axial spacing, measured between the radially outer pressure-exerting surface of the at least one first housing part and the at least one sealing surface of the at least one second housing part, is greater than a spacing measured between the radially outer pressure-exerting surface and the radially inner pressure-exerting surface;

wherein the at least one first housing part includes:
a filter element receiving opening which opens into a filter element receiving chamber arranged in an interior of the at least one first housing part;
a circumferentially closed outer wall radially enclosing the interior of the at least one first housing part;
the filter element receiving chamber formed as a cross-sectionally widened region of the circumferentially closed outer wall of the at least one first housing part, the circumferentially closed outer wall stepping radially outwardly at the filter element receiving chamber, such that the filter element receiving chamber has a larger cross section than remaining portions of the interior of the at least one first housing part;
a plurality of centering ribs arranged directly on and circumferentially spaced apart on a radially outer circumferential side of the circumferentially closed outer wall of the at least one first housing part at the filter element receiving chamber, the plurality of centering ribs projecting radially outwardly from the circumferentially closed outer wall of the at least one first housing part.

11. The filter housing according to claim 10, wherein the axial spacing, measured between the radially outer pressure-exerting surface of the at least one first housing part and the at least one sealing surface of the at least one second housing part, is smaller than an axial spacing measured between the at least one sealing surface of the at least one second housing part and a free rim of the circumferential wall.

12. The filter housing according to claim 10, wherein a ratio between an axial spacing, measured between the inner pressure-exerting surface and the at least one sealing surface of the at least one second housing part, and an axial spacing, measured between the inner pressure-exerting surface and the outer pressure-exerting surface, amounts to between approximately 1 to 1 and 1 to 1.2.

13. The filter housing according to claim 12, wherein said ratio amounts to approximately 1 to 1.1.

14. The filter housing according to claim 10, wherein a ratio between an axial spacing, measured between the inner pressure-exerting surface and the outer pressure-exerting surface, and a spacing, measured in the radial direction between a radially inner circumferential side of the outer pressure-exerting section and a radially outer circumferential side of the inner pressure-exerting section, amounts to between approximately 1 to 0.7 and 1 to 0.9.

15. The filter housing according to claim 14, wherein said ratio amounts to approximately 1 to 0.8.

16. The filter housing according to claim 10, wherein a smallest spacing, measured in the radial direction between a radially outer circumferential side of the outer pressure-exerting section and a radially inner circumferential side of the circumferential wall, and a spacing, measured in the radial direction between a radially outer circumferential side of the radially inner pressure-exerting section and a radially inner circumferential side of the radially outer pressure-exerting section, are approximately of the same size.

17. The filter housing according to claim 10, wherein at least one of the first and second housing parts comprises at least one centering section,
wherein an axial spacing between the at least one centering section and the radially outer pressure-exerting surface is smaller than the axial spacing measured between the radially outer pressure-exerting surface of the at least one first housing part and the at least one sealing surface of the at least one second housing part.

18. A filter device comprising:
a filter housing comprising at least one inlet for a fluid to be filtered and at least one outlet for filtered fluid;
wherein the filter housing comprises at least one first housing part and at least one second housing part connected to each other to be at least partially separable from each other;
wherein the at least one first housing part and the at least one second housing part delimit a seal chamber extending circumferentially relative to an axis of the filter housing;
wherein the at least one first housing part includes:
a filter element receiving opening which opens into a filter element receiving chamber arranged in an interior of the at least one first housing part;
a circumferentially closed outer wall radially enclosing the interior of the at least one first housing part;
the filter element receiving chamber formed as a cross-sectionally widened region of the circumferentially closed outer wall of the at least one first housing part, the circumferentially closed outer wall stepping radially outwardly at the filter element receiving chamber, such that the filter element receiving chamber has a larger cross section than remaining portions of the interior of the at least one first housing part; and
a plurality of centering ribs arranged directly on and circumferentially spaced apart on a radially outer circumferential side of the circumferentially closed outer wall of the at least one first housing part at the filter element receiving chamber, the plurality of centering ribs projecting radially outwardly from the circumferentially closed outer wall of the at least one first housing part;

at least one filter element arranged inside the filter housing such that the at least one filter element separates the at least one inlet from the at least one outlet;

wherein the at least one filter element comprises at least one filter bellows comprising at least one filter medium and the at least one filter element further comprises at least one seal arranged circumferentially relative to an axis of the filter element at an end face edge of the filter bellows, wherein the axis of the filter element coincides with the axis of the filter housing;

wherein the at least one seal is arranged in the seal chamber;

wherein the at least one seal comprises a circumferential fastening region and a circumferential seal region;

wherein the circumferential seal region comprises an at least partially circumferential groove;

wherein the at least one second housing part comprises at least one sealing surface oriented radially relative to the axis of the filter housing and configured to contact the at least one seal;

wherein the at least one first housing part comprises a radially outer pressure-exerting section, positioned axially opposite the at least one sealing surface of the at least one second housing part, wherein the radially outer pressure-exerting section comprises a radially outer pressure-exerting surface configured to press the at least one seal against the at least one sealing surface of the at least one second housing part;

wherein the at least one second housing part further comprises at least one radially inner pressure-exerting section comprising a radially inner pressure-exerting surface, wherein the radially inner pressure-exerting surface is arranged radially inwardly relative to the at least one sealing surface of the at least one second housing part and is configured to press the at least one filter element axially relative to the axis of the filter housing;

wherein the at least one second housing part further comprises a circumferential wall delimiting radially outwardly the seal chamber, wherein the circumferential wall is arranged radially outwardly relative to the at least one sealing surface of the at least one second housing part and radially outwardly relative to the radially outer pressure-exerting section of the at least one first housing part;

wherein the circumferential fastening region of the at least one seal comprises a radial fastening section and an axial fastening section, wherein the radial fastening section extends in a radial direction inwardly relative to the axis of the filter element and the axial fastening section extends with at least one directional component parallel to the axis of the filter element;

wherein the radial fastening section and the axial fastening section engage about the end face edge of the filter bellows;

wherein the radial fastening section comprises a first rear side facing away from the filter bellows, wherein the first rear side forms a holding surface engaged by the radially inner pressure-exerting section of the at least one second housing part;

wherein the axial fastening section comprises a second rear side facing away from the filter bellows, wherein the second rear side forms a radially inner boundary of the at least partially circumferential groove, wherein the at least partially circumferential groove is configured to receive the radially outer pressure-exerting section of the at least one first housing part;

wherein the at least one seal further comprises a circumferential seal projection forming a radially outer boundary of the at least partially circumferential groove opposite the axial fastening section, wherein the circumferential seal projection, viewed in an axial direction along the axis of the filter element, projects past the axial fastening section;

wherein the circumferential seal region comprises an exterior side positioned axially opposite the at least partially circumferential groove relative to the axis of the filter element, wherein an at least axially acting circumferential sealing surface is arranged at the exterior side and is axially spaced farther away from an axial end face of the filter bellows than the holding surface of the radial fastening section;

wherein an axial spacing, measured between a base of the at least partially circumferential groove and the at least axially acting circumferential sealing surface, is greater than a spacing measured between a transition of the base of the at least partially circumferential groove into the axial fastening section and a transition of the holding surface into the circumferential seal region;

wherein an axial spacing, measured between the radially outer pressure-exerting surface of the at least one first housing part and the at least one sealing surface of the at least one second housing part, is greater than a spacing measured between the radially outer pressure-exerting surface and the radially inner pressure-exerting surface.

* * * * *